(12) United States Patent
Tao

(10) Patent No.: US 7,422,182 B2
(45) Date of Patent: Sep. 9, 2008

(54) CABLE CLAMPING APPARATUS

(75) Inventor: Zhi-He Tao, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/308,760

(22) Filed: Apr. 28, 2006

(65) Prior Publication Data

US 2007/0040073 A1    Feb. 22, 2007

(30) Foreign Application Priority Data

Aug. 18, 2005   (CN) .......................... 200520063482

(51) Int. Cl.
*F16L 3/00* (2006.01)

(52) U.S. Cl. ..................................... 248/62; 248/316.4

(58) Field of Classification Search ................... 248/49, 248/62, 229.12, 229.22, 230.3, 231.41, 316.4; 174/64, 135, 652, 659, 663
See application file for complete search history.

(56) References Cited

U.S. PATENT DOCUMENTS

| 831,629 | A | * | 9/1906 | Rollman ................ 248/231.41 |
| 5,822,918 | A | * | 10/1998 | Helfman et al. ................ 47/39 |
| 6,537,104 | B1 | | 3/2003 | Hagmann et al. |
| 6,896,232 | B2 | * | 5/2005 | Crowell et al. ........... 248/316.4 |

* cited by examiner

*Primary Examiner*—Ramon O Ramirez
(74) *Attorney, Agent, or Firm*—Wei Te Chung

(57) ABSTRACT

A cable clamping apparatus for clamping cables, the cable clamping apparatus includes a base, a sliding member forming a plurality of dentations, and a blocking board forming a plurality of dentations corresponding to spares between the dentations of the sliding member; wherein the blocking board is mounted on the base, the sliding member slides on the base to press against the blocking board, and the dentations of the sliding member cooperate with the dentations of the blocking board to clamp the cables.

17 Claims, 5 Drawing Sheets

CABLE CLAMPING APPARATUS

FIELD OF THE INVENTION

The invention relates to a cable clamping apparatus, more particularly to a cable clamping apparatus for use in computer testing and assembly.

DESCRIPTION OF RELATED ART

An important feature of a computer's performance is the quality of signals transmitted through its cables. Therefore, it is very important to test the cables and ensure their quality.

A conventional method for testing the flexibility of cables is to use a cable bend-test device. However, it is expensive to use a cable bend-test device.

Generally there is a twisting-test apparatus to test the hinges on a notebook computer, which includes a test platform and a rocker. During the testing a main body of the notebook computer is fixed on the test platform, a top cover of the notebook computer is fixed on the rocker by a mounting device, the twisting-test apparatus manipulates the top cover to test the hinges which connect the top cover and the main body. However, the twisting-test apparatus is not configured for testing cables.

The principium of the twisting-test apparatus can, however, be used to test the flexibility of cables.

What is needed is a cable clamping apparatus that can cooperate with associated devices, such as a twisting-test device, used in the testing and assembly of computers to test cables.

SUMMARY OF THE INVENTION

An exemplary cable clamping apparatus for clamping cables, the cable clamping apparatus includes a base, a sliding member forming a plurality of dentations, and a blocking board forming a plurality of dentations corresponding to spaces between the dentations of the sliding member; wherein the blocking board is mounted on the base, the sliding member slides on the base to press against the blocking board, and the dentations of the sliding member cooperate with the dentations of the blocking board to clamp the cables. The cable clamping apparatus further comprises a mounting member and a screw, wherein the mounting member is mounted on the base, the sliding member is mounted between the blocking board and the mounting member, a screw hole is defined in the mounting member, a hole is defined in the sliding member corresponding to the screw hole, the screw is passed through the screw hole in the mounting member, and received in the hole.

Other advantages and novel features will become more apparent from the following detailed description when taken in conjunction with the accompanying drawing, in which:

DETAILED DESCRIPTION OF THE INVENTION

Figure 1:
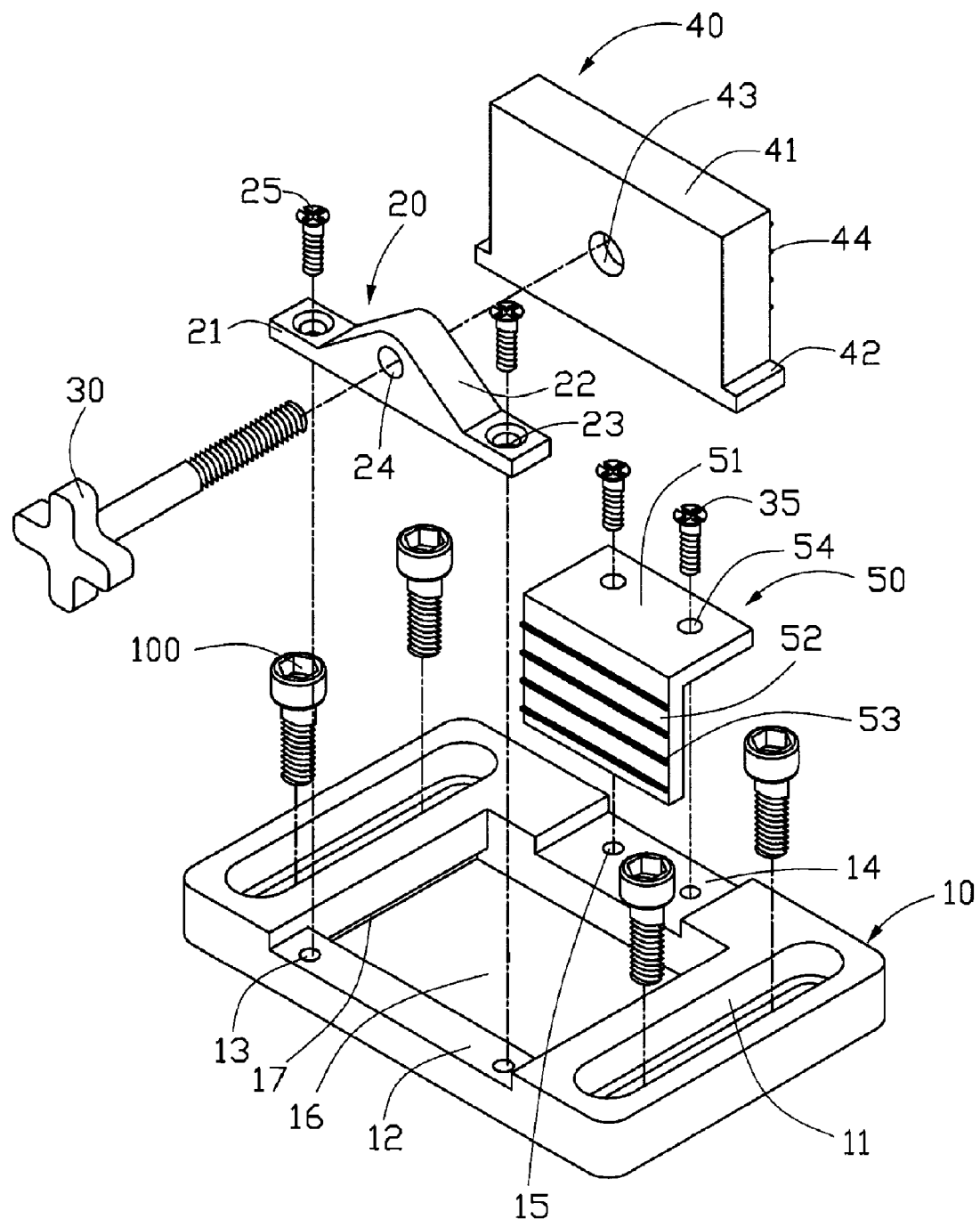
FIG. 1 is an exploded, isometric view of a cable clamping apparatus in accordance with a first preferred embodiment of the present invention.

Refers to FIG. 1, a cable clamping apparatus in accordance with a first preferred embodiment of the present invention includes a base 10, a mounting member 20, a screw 30, a sliding member 40, and a blocking board 50.

A pair of elongated through holes 11 is defined at opposite ends in the base 10 consecutively. A first depressed portion 12 is formed on one side of the base 10 and a second depressed portion 14 is formed on the other side of the base 10 for the mounting member 20 and the blocking board 50 to be mounted thereon. The first depressed portion 12 defines two locating holes 13 and the second depressed portion 14 defines two locating holes 15. The base 10 defines a receiving space 16 at a center thereof, for receiving the sliding member 40 and the blocking board 50. A pair of elongated guiding grooves 17 is defined on an underside of the base 10 along opposite sides of the receiving space 16 consecutively and oriented in a same direction of the through holes 11.

The mounting member 20 includes a base-plate 21, and a protrusion 22 extending up from the base-plate 21. A through hole 23 is defined in each end of the base-plate 21, corresponding to the locating holes 13 of the first depressed portion 12. A screw hole 24 is defined in a center portion of the protrusion 22 with an axis perpendicular to the axes of the through holes 23.

Figure 2:
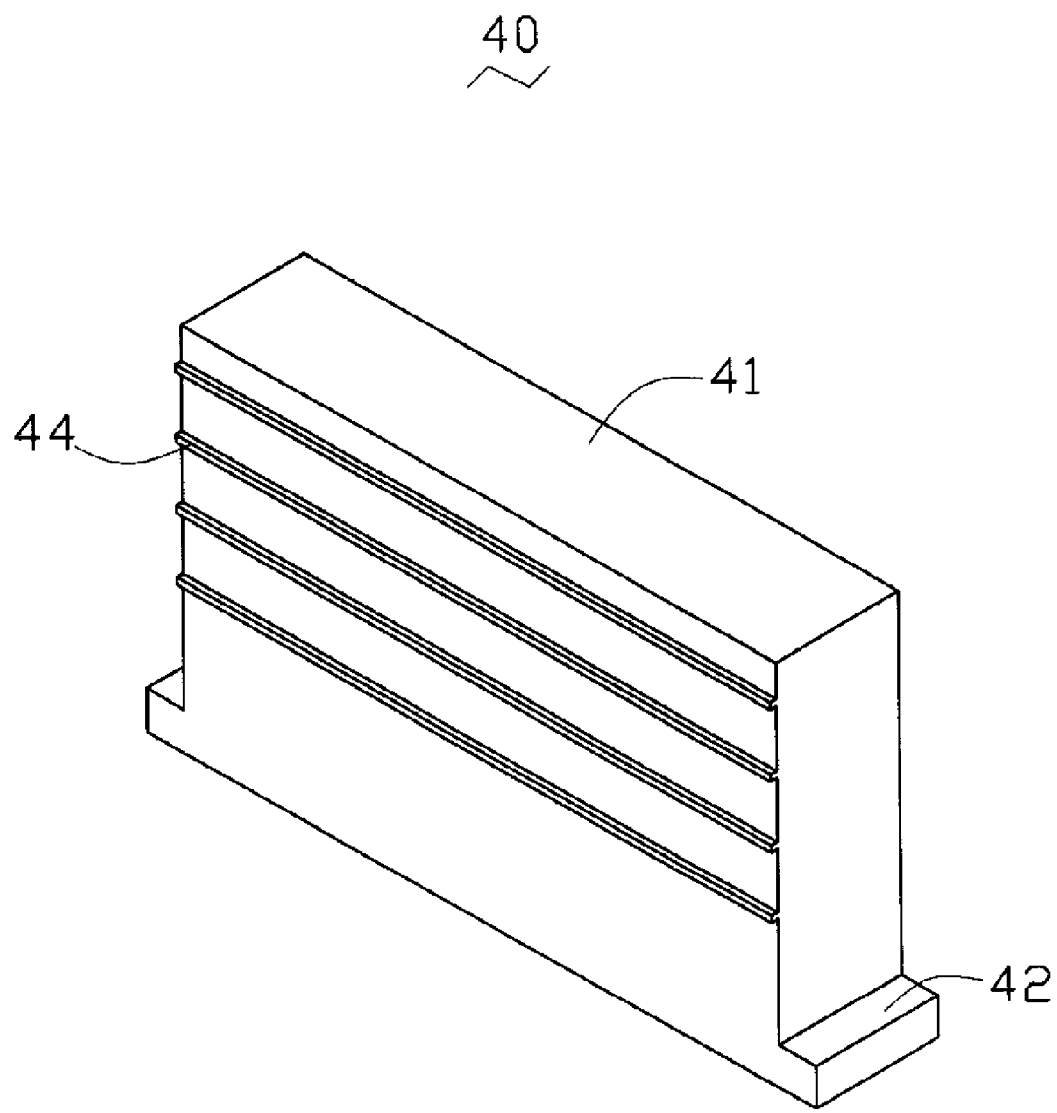
FIG. 2 is an enlarged view of a sliding member of FIG. 1.

Referring to FIG. 2, the sliding member 40 has a generally rectangular-shaped configuration. The sliding member 40 includes a main body 41, and a pair of guiding flanges 42 extending from opposite ends of a bottom of the main body 41. A hole 43 (see FIG. 1) is defined in a center of a face of the main body 41 corresponding to the screw hole 24 of the protrusion 22. The hole 43 does not pass all the way through the main body 41. A plurality of dentations 44 is formed on an opposite face of the main body 41.

Figure 3:
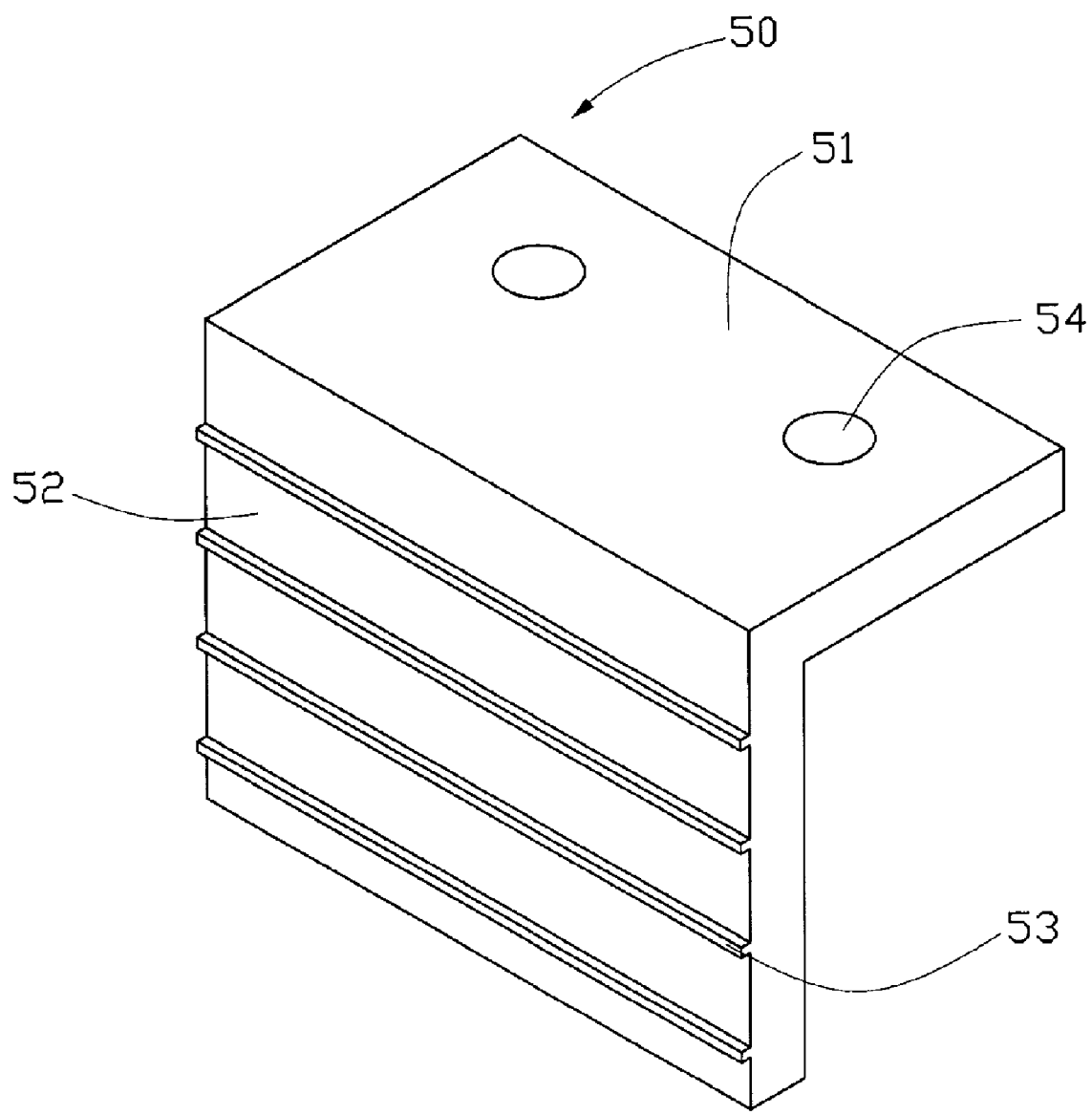
FIG. 3 is an enlarged view of a blocking board of FIG. 1.

Referring to FIG. 3, the blocking board 50 includes a supporting member 51 and a bent portion 52 bent perpendicularly from an edge of the supporting member 51. A plurality of dentations 53 is formed on the bent portion 52 corresponding to spaces between the dentations 44 of the main body 41. Two screw holes 54 are defined in the supporting member 51 corresponding to the locating holes 15 in the second depressed portion 14.

Figure 4:
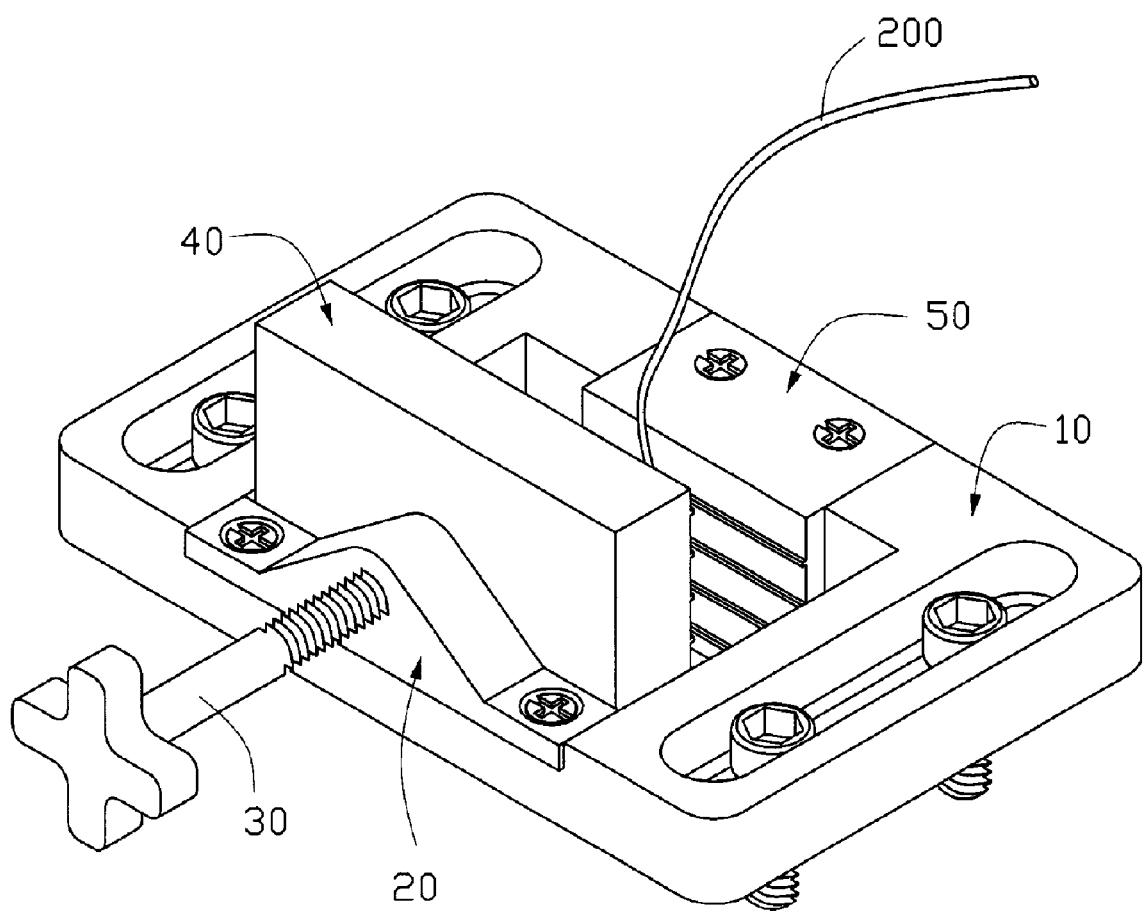
FIG. 4 is an assembled view of FIG. 1.

Referring to FIG. 4, in assembly, the mounting member 20 is mounted on the base 10, by known means such as two screws 25 received through the through holes 23 of the base-plate 21 of the mounting member 20, into the locating holes 13 of the first depressed portion 12. The blocking board 50 is mounted on the base 10 by known means such as two screws 35 extending through the screw holes 54 in the supporting member 51 of the blocking board 50, into the locating holes 15 in the second depressed portion 14. The bent portion 52 of the blocking board 50 extends into the receiving space 16 and out of a bottom of the base 10. The sliding member 40 is inserted through the receiving space 16 from the bottom of the base 10 oriented such that the two guiding flanges 42 of the sliding member 40 are received in the guiding grooves 17 of the base 10. The main body 41 extends out of a top of the base 10. The screw 30 is passed through the screw hole 24 in the protrusion 22 of the mounting member 20, and received in the hole 43 on the main body 41 of the sliding member 40. Thus the sliding member 40 can be urged along a direction to abut the blocking board 50, tapping cables therebetween, or urged along an opposite direction thereby increasing a distance between the sliding member 40 and the blocking board 50, guided by the screw 30 and the guiding grooves 17, the action being accomplished by rotation of the screw 30.

The cable clamping apparatus can be advantageously used to replace a cable bend-twist device. The cable clamping apparatus cooperates with the twisting-test device in the following way: first, the cable clamping apparatus is mounted on a test platform of the twisting-test device by means of fasteners such as screws 100 passed through the through holes 11 be received by the test platform. Then a cable 200 is clamped by the cable clamping apparatus and an end of the cable 200 is tied to a rocker of the twisting-test device. Finally, parameters are set such that the twisting-test device bends the clamped cable in a desired manner testing the flexibility of the cable.

Figure 5:
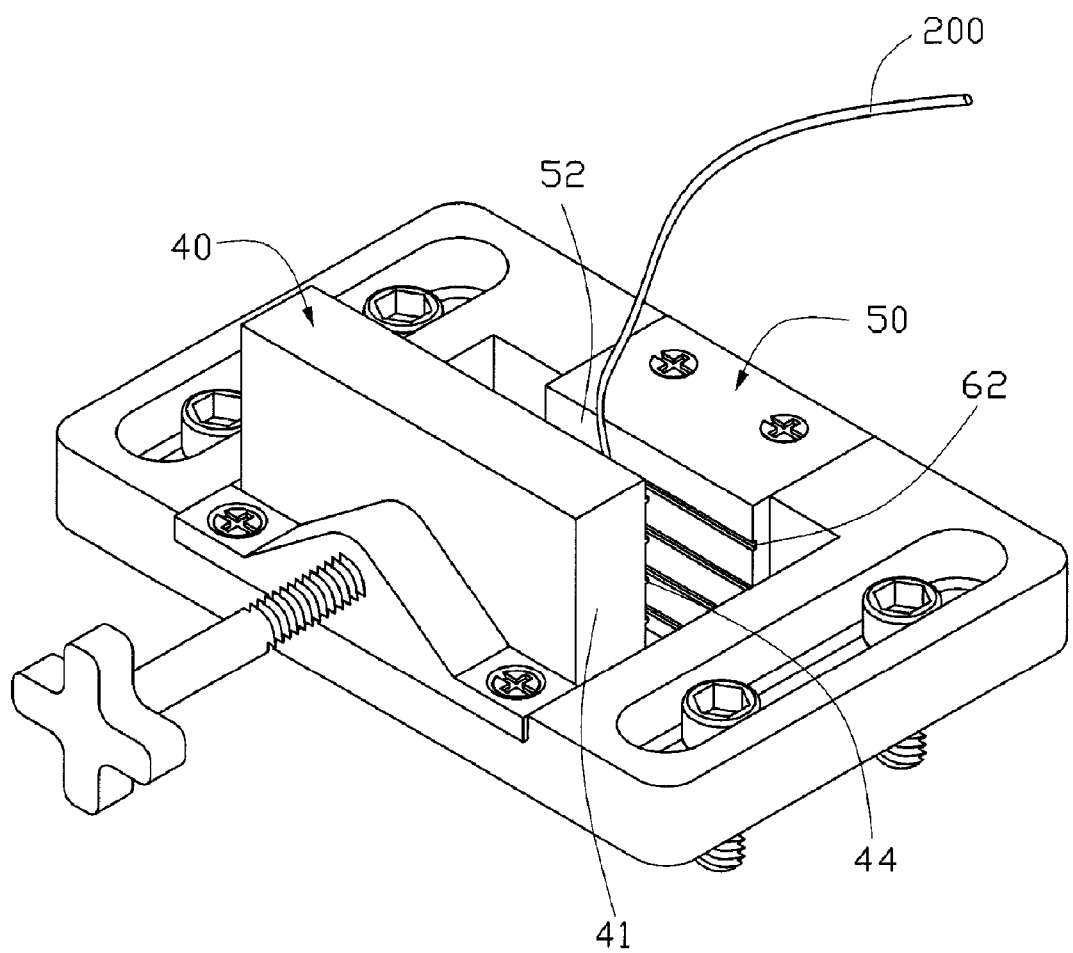
FIG. 5 is an assembled view of a cable clamping apparatus in accordance with a second preferred embodiment of the present invention.

Referring to FIG. 5, a cable clamping apparatus in accordance with a second preferred embodiment of the present invention. The cable clamping apparatus has a similar configuration to the first embodiment. A plurality of notches 62 is formed in the bent portion 52 of the blocking board 50, corresponding to the dentations 44 on the main body 41 of the sliding member 40. The dentations 44 of the main body 41 cooperatively engage with the notches 62 on the bent portion 52 to form at least an occluding member to clamp a cable 200 in order to prevent the cable 200 from gliding up and down.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments.

What is claimed is:

1. A cable clamping apparatus for clamping cables, the cable clamping apparatus comprising:
    a base;
    a sliding member forming a plurality of dentations; and
    a blocking board forming a plurality of dentations corresponding to spaces between the dentations of the sliding member;
    wherein the blocking board is mounted on the base, the sliding member slides on the base to press against the blocking board, the dentations of the sliding member cooperate with the dentations of the blocking board to clamp the cables, the cable clamping apparatus further comprising a mounting member and a screw, wherein the mounting member is mounted on the base, the sliding member is mounted between the blocking board and the mounting member, a screw hole is defined in the mounting member, a hole is defined in the sliding member corresponding to the screw hole, the screw is screwed in the screw hole in the mounting member, and received in the hole, thus urging the sliding member sliding toward the blocking board;
    wherein a first depressed portion is formed on one side of the base, the first depressed portion defines two locating holes, the mounting member includes a base-plate, two through holes are defined in the base-plate corresponding to the locating holes of the first depressed portion, a second depressed portion is formed on the other side of the base, the second depressed portion defines two locating holes, the blocking board includes a supporting member and a bent portion bent perpendicularly from an edge of the supporting member, two screw holes are defined in the supporting member corresponding to the locating holes on the second depressed portion.

2. The cable clamping apparatus as claimed in claim 1, wherein a protrusion extends up from the base-plate, the screw hole of the mounting member is defined in a center portion of the protrusion.

3. The cable clamping apparatus as claimed in claim 1, wherein a receiving space is defined in the base at a center thereof, for receiving the sliding member and the blocking board.

4. The cable clamping apparatus as claimed in claim 3, wherein the sliding member comprises a main body, the hole is defined in a center of a face of the main body.

5. The cable clamping apparatus as claimed in claim 4, wherein a pair of guiding grooves is defined on an underside of the base along opposite sides of the receiving space consecutively, a pair of guiding flanges extends from opposite ends of a bottom of the main body, the sliding member is inserted through the receiving space from a bottom of the base oriented such that the two guiding flanges of the sliding member are received in the guiding grooves of the base.

6. The cable clamping apparatus as claimed in claim 4, wherein the dentations of the sliding member are formed on an opposite face of the main body.

7. The cable clamping apparatus as claimed in claim 6, wherein the dentations of the blocking board are formed on the bent portion corresponding to spaces between the dentations on the opposite face of the main body.

8. A cable clamping apparatus for clamping cables, the cable clamping apparatus comprising:
    a base;
    a mounting member mounted on the base, a screw hole being defined in the mounting member;
    a sliding member forming a plurality of dentations; and
    a blocking board forming a plurality of notches corresponding to the dentations of the sliding member;
    wherein the blocking board is mounted on the base, a screw threaded passes through the screw hole of the mounting member and is capable of rotating in the screw hole to push the sliding member sliding relative to the base to press against the blocking board, and the dentations of the sliding member cooperate with the notches of the blocking board to clamp the cables;
    wherein the sliding member is mounted between the blocking board and the mounting member, a hole is defined in the sliding member corresponding to the screw hole to receive an end of the screw, a first depressed portion is formed on one side of the base, the first depressed portion defines two locating holes, the mounting member includes a base-plate, two through holes are defined in the base-plate corresponding to the locating holes of the first depressed portion, a second depressed portion is formed on the other side of the base, the second depressed portion defines two locating holes, the blocking board includes a supporting member and a bent portion bent perpendicularly from an edge of the supporting member, two screw holes are defined in the supporting member corresponding to the locating holes on the second depressed portion.

9. The cable clamping apparatus as claimed in claim 8, wherein a protrusion extends up from the base-plate, the screw hole of the mounting member is defined in a center portion of the protrusion.

10. The cable clamping apparatus as claimed in claim 8, wherein a receiving space is defined in the base at a center thereof, for receiving the sliding member and the blocking board.

11. The cable clamping apparatus as claimed in claim 10, wherein the sliding member comprises a main body, the hole is defined in a center of a face of the main body.

12. The cable clamping apparatus as claimed in claim 11, wherein a pair of guiding grooves is defined on an underside of the base along opposite sides of the receiving space consecutively, a pair of guiding flanges extends from opposite ends of a bottom of the main body, the sliding member is inserted through the receiving space from a bottom of the base oriented such that the two guiding flanges of the sliding member are received in the guiding grooves of the base.

13. The cable clamping apparatus as claimed in claim 11, wherein the dentations of the sliding member are formed on an opposite face of the main body.

14. The cable clamping apparatus as claimed in claim 13, wherein the notches of the blocking board are formed on the bent portion, the notches corresponding to the dentations on the opposite face of the main body.

15. A cable clamping apparatus comprising:
a base defining a pair of guiding grooves therein;
a mounting member installed to the base and defining a screw hole there through;
a sliding member slid ably mounted to the base via a pair of guiding flanges, extending from the sliding member, being received in and guided by the guiding grooves of the base;
a screw threaded passed through the screw hole of the mounting member; and
a blocking board installed to the base opposite to the sliding member,
wherein a plurality of dentations is formed on one of the sliding member and the blocking board, a plurality of indentations is formed in the other of the sliding member and the blocking board corresponding to the dentations respectively, a distal end of the screw capable of pushing against the sliding member by rotation of the screw in the screw hole of the mounting member, thereby the sliding member being urged to slide along the guiding grooves of the base to press against the blocking board and the dentations of the sliding member cooperatively engaging with the indentions of the blocking board to clamp cables.

16. The cable clamping apparatus as claimed in claim 15, wherein a receiving space is defined in the base, the guiding grooves are defined at opposite sides of the receiving space along a sliding direction of the sliding member.

17. The cable clamping apparatus as claimed in claim 16, wherein the sliding member comprises a main body extending out of a top of the base, the blocking board comprises a supporting member fixed adjacent the receiving space, and a bent portion bent from the supporting member, and the bent portion extends into the receiving space and out of a bottom of the base.

\* \* \* \* \*